MULTI-WAY POPPET VALVE
Filed Sept. 4, 1962 3 Sheets-Sheet 1
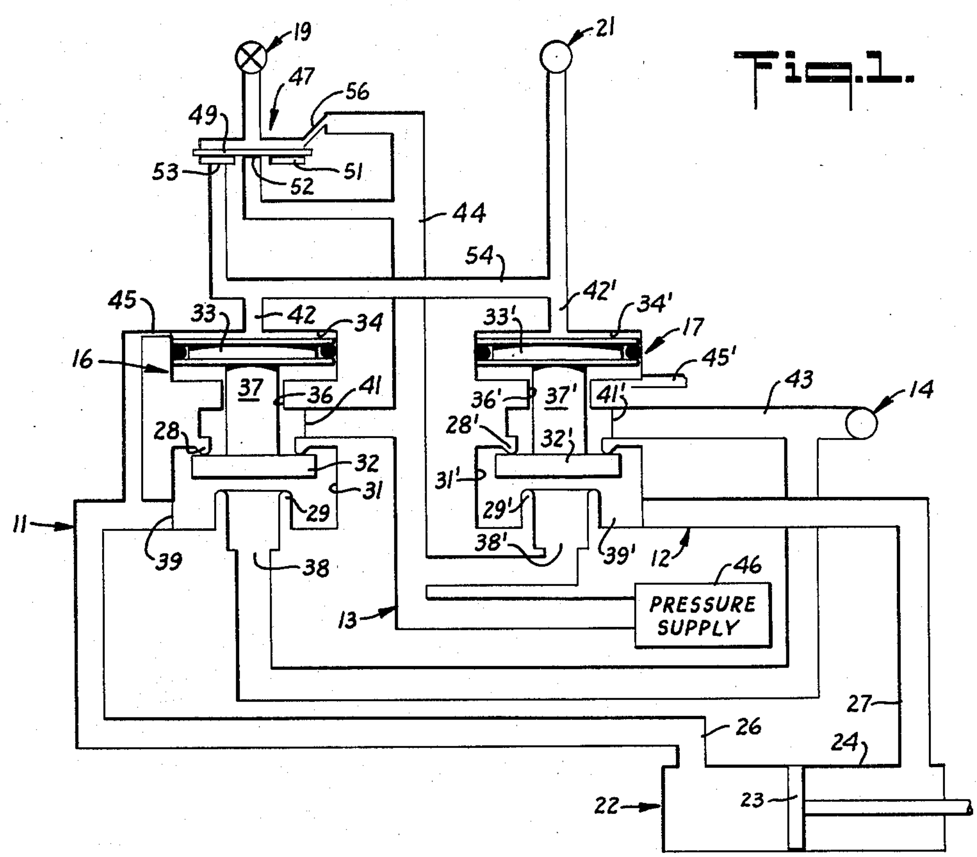
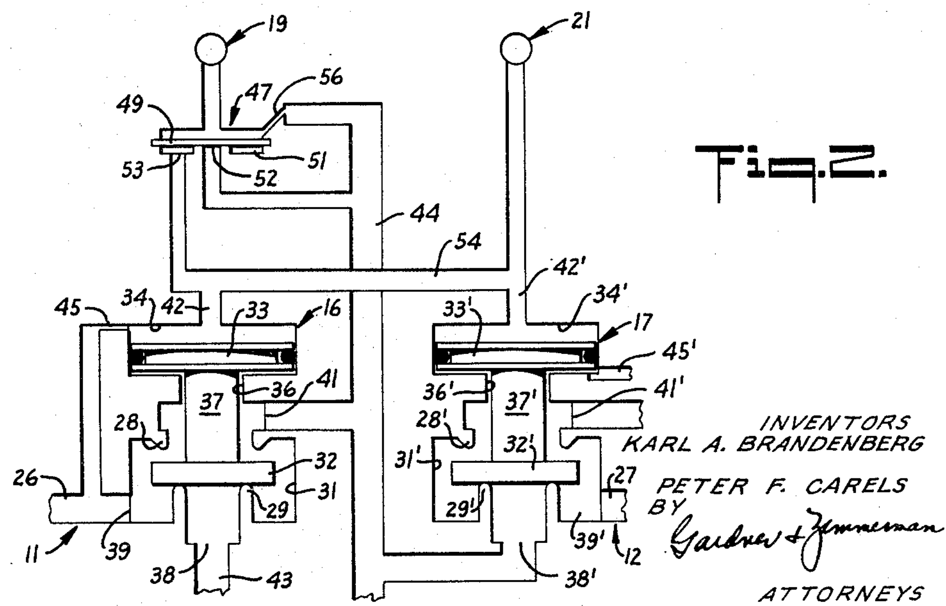
INVENTORS
KARL A. BRANDENBERG
PETER F. CARELS
BY Gardner & Zimmerman
ATTORNEYS March 30, 1965 K. A. BRANDENBERG ETAL 3,175,581
MULTI-WAY POPPET VALVE
Filed Sept. 4, 1962 3 Sheets-Sheet 2
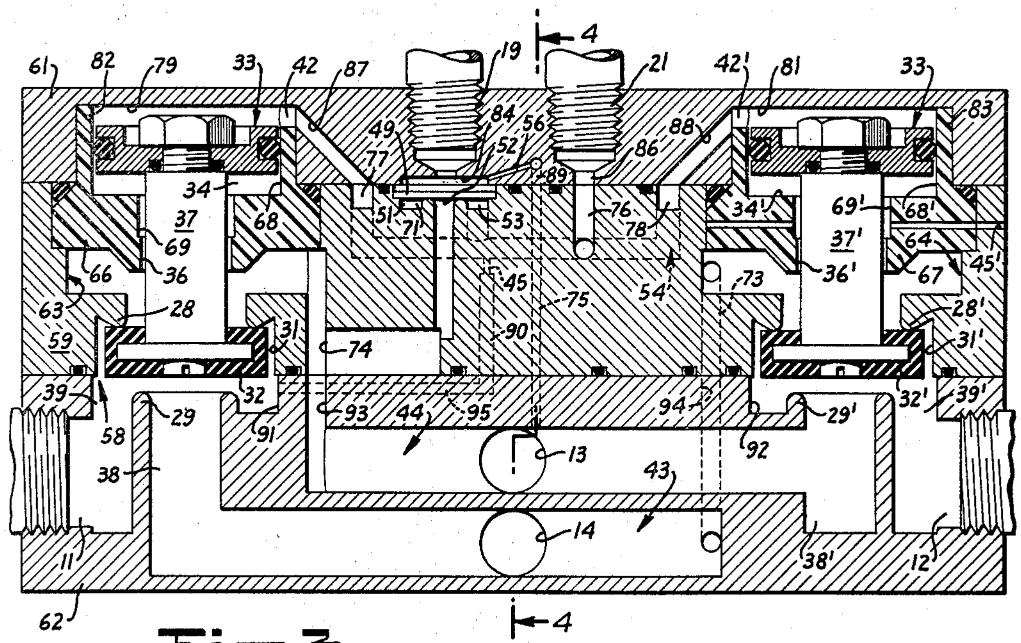
Fig. 3.
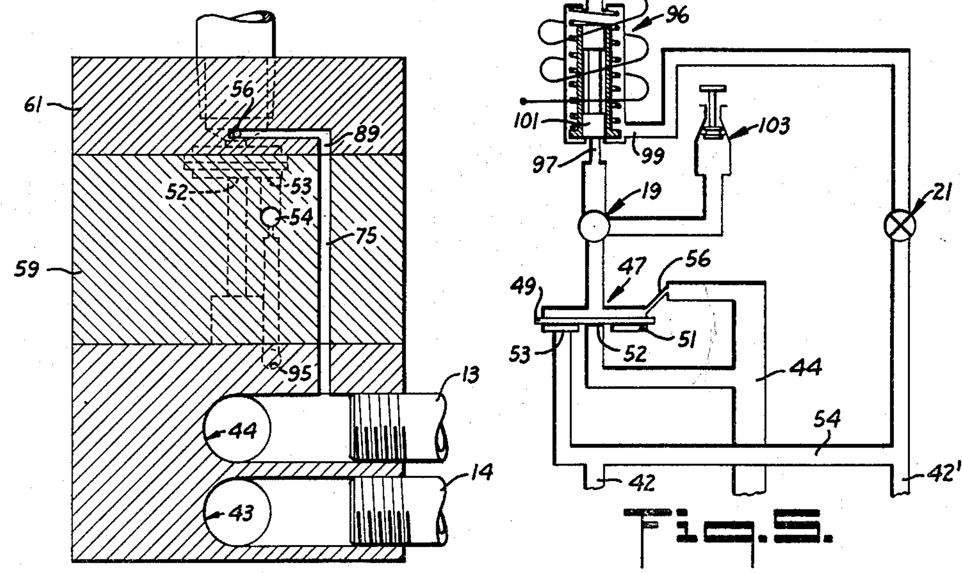
Fig. 4.
Fig. 5.
INVENTORS
KARL A. BRANDENBERG
PETER F. CARELS
BY
Gardner & Zimmerman
ATTORNEYS March 30, 1965 K. A. BRANDENBERG ETAL 3,175,581
MULTI-WAY POPPET VALVE
Filed Sept. 4, 1962 3 Sheets-Sheet 3
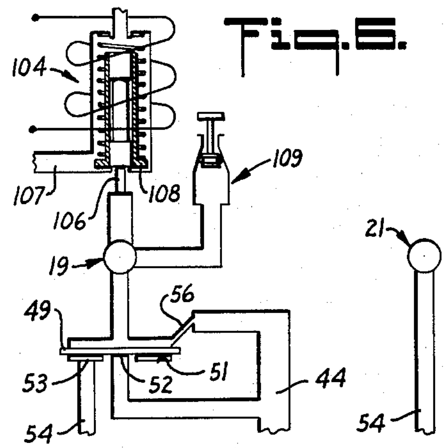
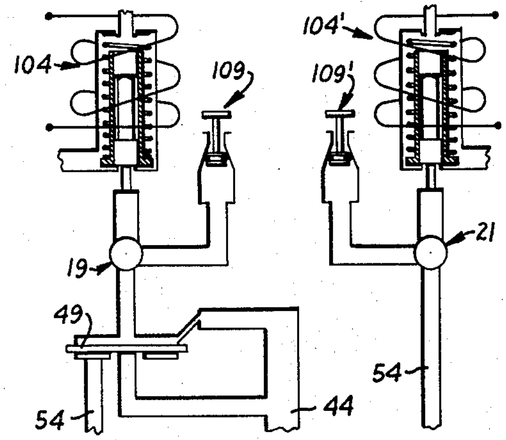
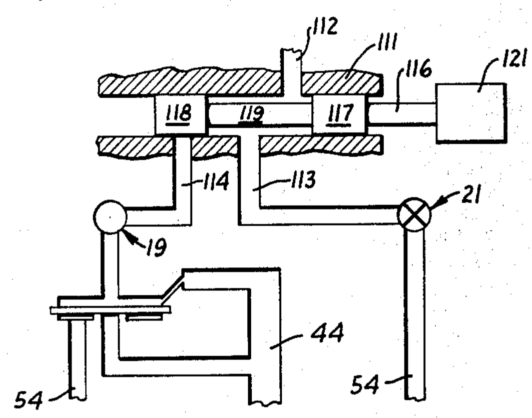
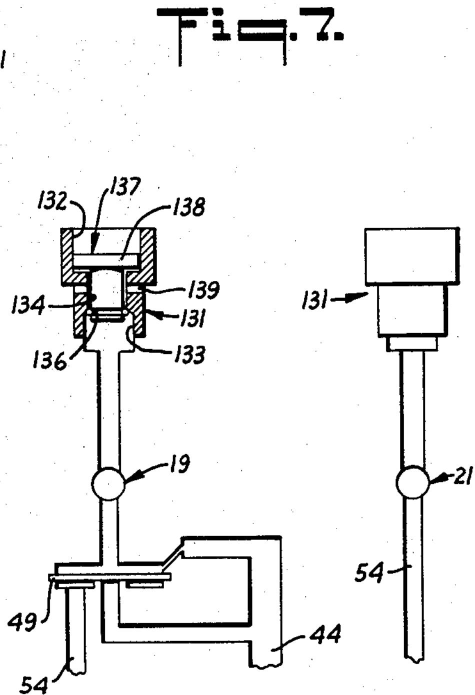
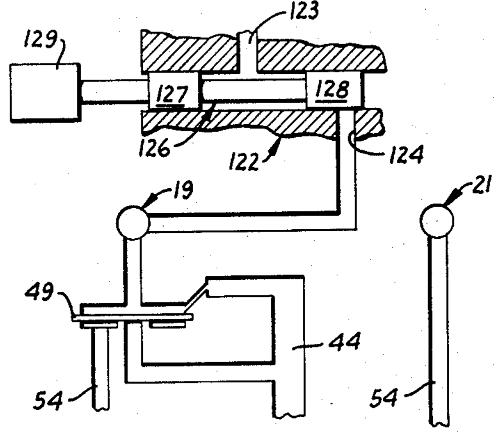
INVENTORS
KARL A. BRANDENBERG
PETER F. CARELS
BY
Gardner & Zimmerman
ATTORNEYS

United States Patent Office 3,175,581
Patented Mar. 30, 1965

3,175,581

MULTI-WAY POPPET VALVE

Karl A. Brandenberg, San Leandro, and Peter F. Carels, Oakland, Calif., assignors to Modernair Corporation, San Leandro, Calif., a corporation of Ohio Filed Sept. 4, 1962, Ser. No. 221,090
19 Claims. (Cl. 137—596.15)

This invention relates to pilot pressure controlled multi-way valves, and is particularly directed to a multi-way poppet valve of this type which is adapted to both single pilot and double pilot control whereby the same basic valve may be used with various control attachments to provide substantially all existing valve types, e.g., single or double solenoid actuated with or without override, cam actuated, and the like.

Multi-way valves are widely used in hydraulic and pneumatic systems for performing a plurality of coordinated valving functions. For example, in the control of a pneumatic drive cylinder a four-way valve is generally used to direct compressed air from an inlet to a selected end of the drive cylinder while simultaneously venting the opposite end. Such operations effect a power stroke of the piston within the cylinder. In some applications it is desirable that the foregoing as well as other pneumatic control functions be effected in response to electrical signals, and to this end numerous valve possibilities exist. Single solenoid control, double solenoid control, and single solenoid actuation with pilot return are but a few of the many electrically operated multi-way valve types which might be employed for the pneumatic control functions. In still other applications a mechanical actuator, such as a cam, foot pedal, or the like, is advantageously employed to operate the multi-way valve in the effect of the desired pneumatic control functions. Thus in order to accommodate the diversified control applications which arise, it has been necessary for manufacturers to produce, and distributors to stock, a wide variety of multi-way valve types.

Advantages are therefore to be gained by the provision of a single basic valve which can be adapted to operate in the manner of substantially all existing valve types merely by the addition of selected ones of various control attachments. Since only one basic valve would be required, production of the basic valve in large quantities would be possible with an attendent reduction in unit cost. The distributor would need then stock only one basic valve per size plus the various control attachments instead of many different valve types.

Accordingly, it is an object of the present invention to provide a pilot pressure operated multi-way valve which permits the two major types of control, namely single pilot and double pilot, such that numerous valve types can be made through the addition of simple control attachments.

Another object of the invention is the provision of a valve of the character described requiring no internal movable mechanical mechanism for co-ordinating the valving functions thereof.

Still another object of the invention is the provision of a pilot pressure controlled four-way valve wherein a pair of piston driven poppets each having a three-way valving action are interrelated through channels to provide the four-way action.

Yet another object of the invention is to provide a four-way valve of the type described which includes a pair of pilot ports interrelated with each other and with the poppets through pilot valving means in such a manner that application of fluid pressure to one of the pilot ports actuates the poppets and release of the pressure returns the poppets to their initial positions while application of fluid pressure to both of the pilot ports and bleed off from one and then the other of the ports actuates the poppets between their two positions.

It is a further object of the invention to provide a multi-way valve of the class described which is of simple readily producible construction such that it may be economically manufactured.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawing and description may be adopted within the scope of the invention as set forth in the claims.

FIGURE 1 is a pneumatic circuit diagram, shown in schematic form, of a four-way valve in accordance with the present invention, as employed in the single pilot control of a pneumatic driven power cylinder.

FIGURE 2 is a diagram similar to FIGURE 1, but with the valve employed in the double pilot control of the cylinder.

FIGURE 3 is a longitudinal section view of a four-way valve embodying the circuits of FIGURES 1 and 2.

FIGURE 4 is a sectional view taken along line 4—4 of FIGURE 3.

FIGURE 5 is a fragmentary pneumatic circuit diagram, shown in schematic form, of the pilot port portion of the valve depicting the employment therewith of an attachment for single solenoid control with or without override.

FIGURE 6 is a diagram similar to that of FIGURE 5, but depicting an attachment for single solenoid actuation with pilot return and with or without override.

FIGURE 7 is a diagram similar to those of FIGURES 5 and 6, but depicting an attachment for double solenoid control with or without overrides.

FIGURE 8 is a diagram similar to those of FIGURES 5–7, but depicting an attachment for mechanical actuator control without pilot return.

FIGURE 9 is a diagram similar to those of FIGURES 5–8, but depicting an attachment for mechanical actuator control with pilot return.

FIGURE 10 is a diagram similar to those of FIGURES 5–9, but depicting an attachment for conversion from pilot bleeder to pilot pressure control.

Referring now to FIGURES 1 and 2 of the drawings, there is shown a pneumatic circuit with which two separate valve ports 11, 12 are selectively communicated with a high pressure fluid supply port 13 and a vented to atmosphere exhaust port 14 respectively, and vice versa, to effect a four-way action. In accordance with the particularly salient features of the present invention, the four-way action is effected by a pair of poppet valve units 16, 17, or equivalent means, which may be single pilot or double pilot controlled by fluid pressure changes induced at a single one or both of a pair of pilot ports 19, 21. Purely for illustrative purposes, the circuit is shown as used for controlling a pneumatic drive cylinder 22 which comprises a piston 23 mounted for longitudinal reciprocation within a cylindrical barrel 24 having air conduits 26, 27 communicated with its opposite ends. With air pressure applied to one end of the cylinder and exhausted from the other, the piston is moved in one direction. With the pressure conditions reversed, the piston is moved in the opposite direction. Thus, control of the piston movement is facilitated upon connection of conduits 26, 27 to the ports 11, 12 by the four-way action effected by the pilot control of poppet valve units 16, 17.

Considering first the general arrangements of the valve units 16, 17, it is to be noted that valve unit 16 includes opposed seats 28, 29 projecting coaxially into the ends of a cylindrical chamber 31. A poppet 32 radially inwardly spaced from the wall of the chamber is movable between the seats 28, 29 by a piston 33 reciprocably mounted in a chamber 34. More particularly, chambers 31, 34 are coaxially communicated through an intermediate chamber 36 concentrically defined in part by seat 28, and a stem 37 interconnecting the piston and poppet is freely slidable within the intermediate chamber. A first port 38 coaxially communicates with poppet chamber 31 through valve seat 29 while a second port 39 is radially communicated with the poppet chamber. A third port 41 radially communicates with the intermediate chamber 36 and a fourth port 42 coaxially communicates with the piston chamber 34 on the opposite end thereof from the intermediate chamber.

Valve unit 17 is identical to valve unit 16 and therefore the corresponding elements thereof are designated by primed like numerals.

It will thus be appreciated that when the poppets 32, 32' are in first or "up" positions of sealed engagement with seats 28, 28', communication is established between first and second ports 38, 38' and 39, 39'. At the same time communication is blocked between the third ports 41, 41' and the first and second ports respectively. When the poppets are in second or "down" positions of sealed engagement with seats 29, 29', communication is blocked between the first ports and second and third ports respectively while communication is established between the second and third ports.

The foregoing valving action of each poppet valve unit is utilized to good advantage to produce the desired four-way action by appropriate interconnection of the ports thereof. More explicitly, first port 38 and third port 41' are communicated with an exhaust conduit 43 which connects to exhaust port 14. First port 38' and third port 41 are communicated with a supply conduit 44 which connects to high pressure fluid supply port 13. The second ports 39, 39' are respectively communicated with the control ports 11, 12. Finally, the end of piston chamber 34 adjacent port 42 is communicated with port 39 through a constricted passage 45 and the end of piston chamber 34' adjacent intermediate chamber 36' is communicated with a vent passage 45' for purposes subsequently described.

Hence with the port 13 connected to a high pressure fluid supply as designated at 46, the poppets in their first positions cause high pressure fluid to be channeled through valve unit 17 to port 12 and therefore through conduit 27 to one end of the pneumatic cylinder 22. At the same time communication is established through valve unit 16 from port 11, and therefore conduit 26, to exhaust port 14, thus venting the opposite end of pneumatic cylinder 22 to atmosphere. When the poppets are in their second positions, the flow conditions are reversed.

Considering now the selective single pilot or double pilot control of the poppet valve units 16, 17 to effect the operating cycle described above, suitable control means are provided to interconnect the pilot ports 19, 21 with each other and with the poppet valve units 16, 17. Such control means are arranged to selectively control pressure at ports 42, 42' of the valve units 16, 17 between relatively low and high values in response to changes in pilot pressure at one pilot port 21 while the other pilot port 19 is blocked. The control means are further arranged to effect a similar pressure variation at ports 42, 42' in response to a pilot pressure change at first one pilot port 19 and then at the other pilot port 21. The pressure variations effected at ports 42, 42' in response to either the single pilot or double pilot actuation of the pilot ports is effective in shifting the valve units 16, 17 between their two positions.

To the foregoing ends the control means preferably comprises a pilot valve unit 47 of the diaphragm type. More particularly valve unit 47 includes a flexible diaphragm 49 mounted transversely in a chamber 51. The chamber is provided with a valve seat port 52 on one side of the diaphragm, while the pilot port 19 is communicated with the chamber on the other side thereof. A third port 53 then communicates with the chamber on the same side of the diaphragm as valve seat port 52. The third port 53 and pilot port 21 are both communicated with a pilot conduit 54 which also communicates with the fourth ports 42, 42' of the poppet valve units. The seat port 52 is communicated with supply conduit 44 as is the pilot port side of the chamber 51 through a constricted passage 56 which is larger than the passage 45 but smaller than the conduit 54.

With the pilot control arrangement just described single pilot control of the valve is facilitated upon blocking of pilot port 19, as by means of a seal plug or the like. This condition of the valve is depicted in FIGURE 1. When no pilot pressure is applied to pilot port 21, the inlet pressure of supply conduit 44 acting through port 41 on the underside of piston 33 pulls poppet 32 against valve seat 28. At the same time the inlet pressure of supply conduit 44 acting through port 38' forces poppet 32' against valve seat 28'. The poppets are thus held in their first, or up, positions to establish the corresponding flow conditions through the poppet valve units previously described whereby inlet pressure is applied to pneumatic cylinder conduit 27 while conduit 26 thereof is exhausted to atmosphere. Application of pilot pressure to port 21 by any suitable means (a number of which are subsequently described herein) results in the application of fluid pressure to the upper sides of pistons 33, 33' through conduit 54 and ports 42, 42'. The pistons are hence forced downward to move the poppets to their second positions in engagement with valve seats 29, 29', it being noted that the vent 45' serves to facilitate downward movement of the piston 33'. The flow conditions in the pneumatic cylinder conduits 26, 27 are correspondingly reversed. Release of pressure from pilot port 21 enables the poppets to revert to their first postions in the manner previously described.

The pneumatic circuit is adapted to double pilot control by the employment of pressure control means, such as any of various specific types subsequently described, at pilot ports 19, 21 to selectively induce pressure changes thereat. Normally pilot ports 19, 21 are closed and the fluid pressure supplied from supply conduit 44 through constricted passage 56 holds diaphragm 49 closed against seat port 52, and the condition of the valve is as depicted in FIGURE 1. When pressure is bled off momentarily from pilot port 19 at a higher rate than air is supplied through constricted passage 56, the supply pressure acting at the underside of diaphragm 49 through port 52 forces the diaphragm off of the seat to open such port 52. Supply conduit 44 is thus communicated with the pilot conduit 54 through the pilot valve. Through ports 42, 42' the fluid pressure is applied to the upper sides of pistons 33, 33', thus forcing the pistons and poppets 32, 32' downward. The poppets are accordingly moved to their second positions in engagement with seats 29, 29', as depicted in FIGURE 2. The flow conditions through valve units 16, 17 are at this time such as to supply pneumatic cylinder conduit 26 with fluid pressure and to exhaust conduit 27 to atmosphere. The valve will remain in this condition after reclosing of pilot port 19, pressure being maintained at the upper sides of pistons 33, 33' through constricted passage 45 which is supplied from port 39 now communicated with supply conduit 44.

Reversal of the valve condition is effected by momentary bleed off of fluid pressure on pilot port 21 at a faster rate than air is supplied through constricted passage 45 whereby pressure in the pilot conduit 54 is reduced. Accordingly, the pressure of supply conduit 44 acting through port 41 on the underside of piston 33 is able to force same upward, thus moving poppet 32 to its first position in engagement with seat 28. At the same time the supply conduit pressure acting through port 38′ forces poppet 32′ to its first position in engagement with seat 28′. The diaphragm 49 is returned to its initial position sealing seat port 52 by the supply conduit pressure acting through constricted passage 56. The valve is thus reversed to the condition depicted in FIGURE 1. The valve will remain in such condition after reclosing of pilot port 21 inasmuch as the upper sides of pistons 33, 33′ are vented through constricted passage 45 which is now exhausted to atmosphere through ports 39 and 11 and exhaust conduit 43.

A preferred structural embodiment of the valve which contains the elements of the pneumatic circuit of FIGURES 1 and 2, and is similarly adapted for controlling a pneumatic drive cylinder is illustrated in FIGURES 3 and 4. More particularly the valve comprises a valve section 58, including a body 59 and cover 61, and a sub-plate 62. The body is preferably rectangular in plan view and provided with bores 63, 64 adjacent its opposite ends which are configured to define the valve seats 28, 29 and 28′, 29′ and portion of the poppet chambers 31, 31′ and intermediate chambers 36, 36′. The uper ends of bores 63, 64 are outwardly stepped to define enlarged shouldered portions for receiving poppet valve unit cylindrical inserts 66, 67, preferably of a low coefficient of friction material such as Teflon or the like. The inserts are provided with cylindrical recesses 68, 68′ in their upper ends communicated at their bases with coaxial bores 69, 69′. The pistons 33, 33′ are slidably disposed within the recesses whereby the latter define the bottom and side walls of the piston chambers 34, 34′. The stems 37, 37′ freely extend coaxially through the bores 69, 69′, such bores cooperating with the bores 63, 64 to define the intermediate chambers 36, 36′. The poppets 32, 32′ as secured to the stems 37, 37′ are disposed within enlarged lower portions of the bores 63, 64 beyond the seats 28, 28′ which define portions of the poppet chambers 31, 31′.

The body 59 further includes a concavity 71, in the central portions of its upper face which is configured to define portions of the pilot valve chamber 51 including the seat port 52 and port 53. The upper end of the concavity is outwardly stepped to provide an enlarged shouldered portion which receives the diaphragm 49.

The body 59 is also appropriately formed to include portions of the various interconnecting conduits and the like of the pneumatic circuit described hereinbefore. A detailed description of the specific conduit arrangement in the body is not included herein since the arrangement is believed to directly follow from the description of the pneumatic circuit previously considered. It suffices to state that the exhaust conduit 43 includes a coupling bore portion 73 which opens to the lower face of the body. Similarly the supply conduit 44 is provided with a coupling bore portion 74 which likewise opens to the lower face of the body and a coupling bore portion 75 which opens to the upper face of the body. Pilot conduit 54 has three coupling bore portions 76, 77, 78 opening to the upper face of the body.

The cover 61 is preferably rectangular and adapted for sealed attachment to the upper face of the body. Recesses 79, 81 are formed in the underface of the cover and adapted to concentrically receive inwardly stepped upper cylindrical flange portions 82, 83 of the poppet valve inserts 66, 67. The base surfaces of recesses 79, 81 thus define the upper end walls of piston chambers 34, 34′. A concavity 84 is formed in the underface of the cover in facing relation to concavity 71 so as to complete the pilot valve chamber 51. Bore portions 86, 87, 88 are positioned to communicate with the coupling bore portions 76, 77, 78 of the pilot conduit which open to the upper face of the body. Pilot ports 19, 21 extend vertically downward from the top face of the cover to respectively terminate in the concavity 84 and in a coupling bore portion 86. Coupling bore portions 87, 88 of pilot conduit 54 extend from the undersurface of the cover to the valve ports 42, 42′ which are formed radially through the upper ends of the inserts 66, 67. Similarly, a coupling bore 89 formed in the underface of the cover communicates with supply conduit coupling bore portion 75 at the upper face of the body. The constricted passage 56 extends from the end of bore 89 to the pilot valve concavity 84.

The subplate 62 is rectangular in plain and adapted for the sealed attachment to the under face of the body. Concavities 91, 92 are formed in the upper face of the plate to be in facing relation to the enlarged lower portions of the body bores 63, 64. The seats 29, 29′ and ports 39, 39′ are formed in the bases of the concavities such that the concavities complete the poppet chambers 31, 31′. The supply and exhaust ports 13, 14 extend transversely into the subplate from one side thereof to terminate in portions of the supply and exhaust conduits 43, 44. A coupling bore 93 of the supply conduit and a coupling bore 94 of the exhaust conduit open to the top face of the subplate at positions of communication with the body coupling bores 74, 73. The control ports 11, 12 extend inward from the opposite ends of the subplate and are communicated with the valve ports 39, 39′. Finally the constricted passage 45 comprises a bore 95 which extends longitudinally from concavity 91 to the upper face of the subplate at a position in communication with a vertical bore 90 extending upwardly from the lower face of the body into communication with the conduit 54. Subplates having varied port sizes may be interchangeably employed with the same valve section to accommodate different sizes of external piping.

Considering now the various control attachments which may be employed with the valve to provide assorted valve types, reference is first made to FIGURE 5 which illustrates attachments for single solenoid control and single solenoid control with override. As shown therein, a solenoid unit 96 is provided which has a constricted port 97, exhaust port 98, and port 99. A movable member 101 of the unit normally closes port 97 and communicates ports 98 and 99 when the solenoid 102 is deenergized. With the solenoid energized, movable member 101 opens port 97 to port 99 and closes port 98.

Ports 97 and 99 are respectively communicated with pilot ports 19, 21 of the valve. Thus when the unit is deenergized pilot port 21 is vented to atmosphere through ports 98, 99 while pilot port 19 is blocked by member 101 at port 97. The fluid pressure in supply conduit 44 thus maintains the poppet valve units 16, 17 in their first or "up" positions. Energization of the solenoid unit effects application of supply pressure to pilot port 21 by way of supply conduit 44, constricted passage 56, pilot port 19, and solenoid unit ports 97, 99. The pressure in the pilot conduit 54 hence forces the poppet valve units to their second or "down" positions . The poppet valve units are retained in such positions as long as the solenoid unit remains energized.

Override control is added by connection of a bleeder valve 103 to pilot port 19. Such override bleeder valve facilitates actuation of the multi-way valve without energization of the solenoid unit 96. More particularly, if the bleeder valve is actuated, fluid pressure bleeds off from above diaphragm 49 to displace same from seat port 52. Supply pressure hence is applied to pilot conduit 54 through the seat port 52 and port 53 of the pilot valve 47, thus actuating the poppet valve units 16, 17 to their down positions.

Referring now to FIGURE 6, attachments are shown for single solenoid actuation with pilot return without or with override. In this instance a solenoid unit 104 is provided having a constricted inlet port 106, an exhaust port 107, and a solenoid actuated movable member 108 which closes the port 106 when deenergized and opens the port when energized. Port 106 is communicated with pilot port 19, and pilot pressure is maintained at pilot port 21. If desired, an override bleeder valve 109 may be communicated with pilot port 19. When the solenoid unit is energized, or bleeder valve 109 is actuated, air is bled off above diaphrgam 49. Thereafter the poppet valve units are moved to their down positions in the manner previously described with respect to double pilot control of the valve. Return of the poppet valve units to their up positions is effected in response to momentary bleed-off of pressure from pilot port 21 in accordance with double pilot control operation.

Double solenoid control with or without overrides is accomplished in a manner which follows from that just described for single solenoid actuation with pilot return. More particularly as shown in FIGURE 7, a second solenoid unit 104' identical to unit 104 associated with pilot port 19 is communicated with pilot port 21. A bleeder valve 109' may likewise be communicated with the latter port. Energization of the respective solenoid units 104, 104' or bleeder valves 109, 109' bleeds pressure from above the diaphragm 49 or from the pilot conduit 54 through port 21 to thus operate the poppet valve units in the manner previously described for double pilot control.

Considering now various mechanical actuator attachments which may be employed to control the valve of the present invention, reference is first made to FIGURE 8. As shown therein an attachment is provided which includes a tubular body 111 having ports 112, 113, 114 communicating with the body bore at longitudinally spaced positions thereof. A cylindrical actuator rod 116 is slidably disposed within the body 111 and such rod has enlarged portions 117, 118 longitudinally spaced by an inwardly stepped reduced portion 119. The enlarged portions 117, 118 engage the body bore wall and when adjacent the ports, close the same. The enlarged and reduced portions of the rod are appropriately dimensioned such that when enlarged portion 118 closes port 114, ports 112, 113 are communicated through the annular space between the bore wall and reduced portion 119. Likewise when enlarged portion 117 closes port 112, ports 113, 114 are communicated. Movement of the rod between the foregoing two positions may be facilitated by any suitable actuator 121 coupled thereto, e.g., hand lever, foot pedal, cam actuator, or the like.

In the connection of the actuator attachment to the valve, ports 114, 113 are respectively communicated with pilot ports 19, 21, while port 112 is vented to atmosphere. With the actuator rod positioned as shown, the pilot port 21 is vented to atmosphere through ports 112, 113. Port 114 is closed thus blocking pilot port 19. The conditions established are thus analogous to those described with respect to the single solenoid arrangement of FIGURE 5. The pilot conduit 54 is thus vented and supply pressure appears at pilot port 19. The poppet valves are retained in the up positions.

Movement of the actuator rod to its other position closes port 112 and communicates ports 113, 114. The supply pressure at pilot port 19 is thus channeled to pilot port 21, and therefore to the pilot conduit to force the poppet valves to their down positions.

FIGURE 9 illustrates a mechanical actuator attachment for mechanical actuation with pilot return. In this case the actuator includes a tubular body 122, having ports 123, 124 communicating with the body bore at longitudinally spaced positions thereof. An actuator rod 126 having longitudinally spaced enlarged portions 127, 128 is slidably disposed in the body bore, and any suitable mechanical actuator 129 is coupled to the rod. Port 123 is vented to atmosphere while port 124 is communicated with pilot port 19. Pilot port 21 is employed for pilot return. With the actuator rod positioned as depicted in FIGURE 9, enlarged portion 128 closes port 124 to thus block pilot port 19. Momentary movement of the rod effects communication between ports 123, 124 to thus vent pilot port 19 to atmosphere. The poppet valves are responsively urged to their down positions in the manner previously described for double pilot control. Bleed off of pressure from port 21 returns the poppet valves to their up positions.

Any of the bleed off control functions previously described may be converted into pilot pressure actuation by means of the pilot control converter attachment illustrated in FIGURE 10. The converter comprises a body 131 having a recess 132 in one end, a recess 133 in the opposite end, and an interconnecting reduced bore 134 coaxially therebetween. The base of recess 133 is adapted to define a valve seat for a seal ring 136 carried at the end of a plunger 137 which is freely slideable in the bore 134. The plunger has an enlarged head 138 slidable in recess 132. In addition exhaust ports 139 extend radially through the body into communication with the bore 134. The recess 133 of one converter is communicated with pilot port 19 and the same recess of another converter is communicated with pilot port 21. Thus the supply pressure at pilot ports 19, 21 operates to hold the seal ring 136 of the respective units against the seats in recesses 133. Application of pressure to the recess 132 of one unit acts on the plunger head 138 to move the plunger and unseat the seal ring 136. The pressure at the corresponding pilot port is hence bled to atmosphere and the valve is operated in the manner described relative to double pilot control.

What is claimed is:

1. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving element movable between said two positions in response to shifts in pressure at said fourth ports between relatively high and low values, pilot means having first and second pilot ports, said first pilot port communicated with said fourth ports, said pilot means including a pilot valve having first and second passages, said first passage of said pilot valve communicated with said first ports, said second passage of said pilot valve communicated with said fourth ports, said pilot valve establishing or interrupting communication between the first and second passages thereof in response to pressure changes at said second pilot port, means communicating said inlet with said first and second pilot ports, and an actuating unit having first, second, and third ports, said unit having a first position communicating its first and second ports and a second position communicating its first and third ports, said first port of the unit connected to said first pilot port, said second port of the unit vented to atmosphere, and said third port of the unit connected to said second pilot port.

2. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to shifts in pressure at said fourth ports between relatively high and low values, pilot means having first and second pilot ports, said first pilot port communicated with said fourth ports, said pilot means including a pilot valve having a first and second passages, said first passage of said pilot valve communicated with said first ports, said second passage of said pilot valve communicated with said fourth ports, said pilot valve establishing or interrupting communication between the first and second passages thereof in response to pressure changes at said second pilot port, means communicating said inlet with said first and second pilot ports, an actuating unit having first, second, and third ports, said unit having a first position communicating its first and second ports and a second position communicating its first and third ports, said first port of the unit connected to said first pilot port, said second port of the unit vented to atmosphere, and said third port of the unit connected to said second pilot port, and an override bleeder valve connected to said second pilot port.

3. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable betwen said two positions in response to shifts in pressure at said fourth ports between relatively high and low values, pilot means having first and second pilot ports, said first pilot port communicated with said fourth ports, said pilot means including a pilot valve having first and second passages, said first passage of said pilot valve communicated with said first ports, said second passage of said pilot valve communicated with said fourth ports, said pilot valve establishing or interrupting communication between the first and second passages thereof in response to pressure changes at said second pilot port, means communicating said inlet with said first and second pilot ports, an actuating unit having first and second ports, said first port of the unit vented to atmosphere, said second port of the unit connected to said second pilot port, said unit having a first position closing its second port and a second position communicating its first and second ports and means for selectively venting said first pilot port to atmosphere.

4. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to shifts in pressure at said fourth ports between relatively high and low values, pilot means having first and second pilot ports, said first pilot port communicated with said fourth ports, said pilot means including a pilot valve having first and second passages, said first passage of said pilot valve communicated with said first ports, said second passage of said pilot valve communicated with said fourth ports, said pilot valve establishing or interrupting communication between the first and second passages thereof in response to pressure changes at said second pilot port, means communicating said inlet with said first and second pilot ports, an actuating unit having first and second ports, said first port of the unit vented to atmosphere, said second port of the unit connected to said second pilot port, said unit having a first position closing its second port and a second position communicating its first and second ports, means for selectively venting said first pilot port to atmosphere, and an override bleeder valve communicated with said second pilot port.

5. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to shifts in pressure at said fourth ports between relatively high and low values, pilot means having first and second pilot ports, said first pilot port communicated with said fourth ports, said pilot means including a pilot valve having first and second passages, said first passage of said pilot valve communicated with said first ports, said second passage of said pilot valve communicated with said fourth ports, said pilot valve establishing or interrupting communication between the first and second passages thereof in response to pressure changes at said second pilot port, means communicating said inlet with said first and second pilot ports, an actuating unit coupled to said second pilot port for normally blocking the same and selectively releasing pressure therefrom, and an actuating unit coupled to said first pilot port for normally blocking the same and selectively releasing pressure therefrom.

6. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to pressure changes at said fourth ports, and pilot control means including a plurality of pilot ports for effecting pressure changes at said fourth ports in response to pressure changes at the pilot ports, said pilot control means including a pilot valve, said pilot control means having one of said pilot ports communicated with said fourth ports and at least one other of said pilot ports coupled to said pilot valve, said pilot valve coupling said fourth ports to said inlet and having a valving member opening and closing communication therebetween in response to pressure changes at its associated pilot port.

7. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to pressure changes at said fourth ports, and pilot control means including a plurality of pilot ports for effecting pressure changes at said fourth ports in response to pressure changes at the pilot ports, said pilot control means including a pilot valve, said pilot control means having one of said pilot ports communicated with said fourth ports and at least one other of said pilot ports coupled to said pilot valve, said pilot valve coupling said fourth ports to said inlet and having a valving member opening and closing communication therebetween in response to pressure changes at its associated pilot port, said pilot valve having a constricted passage communicating its associated pilot port to said inlet.

8. In a multi-way valve having an inlet connectable with a source of pressurized fluid, an exhaust, and a plurality of control ports to be selectively communicated with said inlet and exhaust, the combination comprising a plurality of primary valve units each having one port connected with said inlet, a second port connected with said exhaust, a third port connected with one of said control ports, and a fourth port, said valve units each having a two position valving element for shifting communication from between said third and second ports to between said third and first ports in response to movement of the element between the two positions thereof, each said valving elements movable between said two positions in response to shifts in inlet pressure between said first and fourth ports, means defining first and second pilot ports, a pilot valve unit having first, second, and third ports and a valving member positioned to interrupt communication between the first and second ports thereof upon the admission of high pressure to the third port thereof, said third port of the pilot valve unit connected to said second pilot port, means connecting said first port of the pilot valve unit to said inlet and means communicating said second port of the pilot valve unit and said first pilot port with said fourth ports.

9. The combination of claim 8, further defined by means defining a constricted passage communicating said inlet with said third port of said pilot valve unit.

10. A four-way valve comprising means defining an inlet port for connection to a pressurized fluid source, an exhaust port, and a pair of control ports, a pair of poppet valve units each having a poppet and piston coupled therewith movable between first and second positions, said valve units each having first and second ports communicable with each other, a third port communicable with said first and second ports and with one side of said piston, and a fourth port communicable with the other side of said piston, said poppet interrupting communication between said third port and said second and first ports in said first position and interrupting communication between said first port and said second and third ports in said second position, said first valve unit having a constricted passage communicating the fourth and second ports thereof, means defining first and second pilot ports, a pilot valve unit having first, second and third ports and a valving member positioned to interrupt communication between the first and second ports thereof upon the admission of high pressure to the third port thereof, said third port of the pilot valve unit connected to said second pilot port, a supply conduit communicating said inlet port, said third port of said first poppet valve unit, said first port of said second poppet valve unit, and said first port of said pilot valve unit, means defining a constricted passage communicating said third port of said pilot valve unit with said supply conduit, an exhaust conduit communicating said exhaust port with said first port of said first poppet valve unit and said third port of said second poppet valve unit, a pilot conduit communicating said first pilot port, said second port of said pilot valve unit, and said fourth ports of said poppet valve units, and means communicating said second ports of said poppet valve units with said control ports.

11. A four-way valve according to claim 10, wherein said pilot valve unit comprises means defining a valve chamber with the first and second ports of the unit on one side and the third port of the unit on the other side thereof, and a diaphragm extending across the chamber and separating same into two isolated sections.

12. A four-way valve comprising means defining an inlet port for connection to a pressurized fluid source, an exhaust port, and a pair of control ports; a pair of poppet valve units, each unit including means defining a cylindrical poppet chamber having opposed seats projecting coaxially thereinto with the first of said seats circumscribing a first port, said chamber having a second port in radial communication therewith adjacent said first port, means defining a cylindrical piston chamber in coaxial communication with said poppet chamber through an interconnecting intermediate chamber transpiercing the second of said seats, said intermediate chamber having a third port in radial communication therewith, said piston chamber having a fourth port in communication therewith on the distal side thereof with respect to said intermediate chamber, a poppet slidably disposed in said poppet chamber and movable between first and second positions of engagement with said first and second seats respectively, a piston slidably disposed in said piston chamber, and a stem freely slidably disposed in said intermediate chamber and connected at its opposite ends to said poppet and piston; means defining first and second pilot ports; a pilot valve unit having first, second, and third ports and a diaphragm valving member positioned to interrupt communication between the first and second ports thereof upon the admission of high pressure to the third port thereof, said third port of the pilot valve unit connected to said second pilot port; a supply conduit communicating said inlet port, said third port of the first poppet valve unit, said first port of the second poppet valve unit, and said first port of said pilot valve unit; means defining a constricted passage communicating said third port of said pilot valve unit with said supply conduit; an exhaust conduit communicating said exhaust port with said first port of said first poppet valve unit and said third port of said second poppet valve unit; a pilot conduit communicating said first pilot port, said second port of said pilot valve unit, and said fourth ports of said poppet valve units; means communicating said second ports of said poppet valve units with said control ports; and means defining a constricted passage communicating the fourth and second ports of said first poppet valve unit.

13. A four-way valve according to claim 12, further defined by an actuating unit having first, second and third ports, said unit having a first position communicating its first and second ports and a second position communicating its first and third ports, said first port of the actuating unit connected to said first pilot port, said second port of the actuating unit vented to atmosphere, and said third port of the actuating unit connected to said second pilot port.

14. A four-way valve according to claim 12, further defined by a pair of actuating units each having first and second ports, said first ports of the actuating units vented to atmosphere, said second ports of the actuating units respectively connected to said first and second pilot ports, said actuating units each having a first position closing its second port and a second position communicating its first and second ports.

15. A four-way valve according to claim 12, further defined by a solenoid actuating unit including a tubular body having a first constricted port at one end, a second port at the other end vented to atmosphere, and a third port adjacent the first constricted port, a solenoid actuated valving member having a normal unenergized position blocking the first constricted port of the actuating unit while communicating the second and third ports thereof and an energized position blocking the second port of the actuating unit while communicating the first and third ports thereof, means communicating the first and third ports of the actuating unit with respectively said second and first pilot ports, and an override bleeder valve communicating with said second pilot port.

16. A four-way valve according to claim 12, further defined by a pair of solenoid actuating units, each of said units including a body having a first constricted port, a second port vented to atmosphere and a solenoid actuated valving member having a normal unenergized position blocking communication between the first and second ports of the actuating unit and an energized position establishing communication therebetween, means connecting the first ports of said actuating units to respectively said first and second pilot ports, and a pair of override bleeder valves respectively communicated with said first and second pilot ports.

17. A four-way valve according to claim 12, further defined by a mechanical actuator unit, said actuator unit including a tubular body having first, second, and third ports at longitudinally spaced positions thereof, said first port of the body vented to atmosphere, a mechanically actuated rod longitudinally slidable in said body, said rod having longitudinally spaced enlarged portions with a stepped reduced portion therebetween, said rod having a first position wherein one of said enlarged portions closes said third port of the body and said reduced portion is intermediate said first and second ports thereof, said rod having a second position wherein the other of said enlarged portions closes the first port of the body and said reduced portion is intermediate said second and third ports thereof, and means connecting the second and third ports of said body to respectively said first and second pilot ports.

18. A four-way valve according to claim 12, further defined by a mechanical actuator unit, said actuator unit including a tubular body having first and second ports at longitudinally spaced positions thereof, said first port of the body vented to atmosphere, a mechanically actuated rod longitudinally slidable in said body, said rod having longitudinally spaced enlarged portions with a stepped reduced portion therebetween, said rod having a first portion wherein one of said enlarged portions closes the second port of said body and a second position wherein the reduced portion of said rod is intermediate the second and first ports of the body to communicate same, means connecting the second port of said body to said second pilot port, and means for selectively venting said first pilot port to atmosphere.

19. A four-way valve according to claim 12, further defined by a pair of bleeder units each having a body with first and second recesses in its opposite ends connected by a coaxial bore, said first recess having a seat circumscribing said bore, said body having a radial port communicating with said bore, and a plunger freely slidably disposed in said bore said plunger having a seal ring at one end engagable with said seat and a head at the other end slidable in said second recess, means communicating said first recesses of the bodies of the bleeder units with said first and second pilot ports respectively, and means for selectively applying fluid pressure to the second recesses of the bodies of the respective bleeder units.

References Cited by the Examiner

UNITED STATES PATENTS

| | | | |
|---|---|---|---|
| 2,881,801 | 4/59 | McCormick | 91—47 X |
| 3,038,500 | 6/62 | Lansky et al. | 137—596.15 |
| 3,113,590 | 12/63 | Olson | 137—625.6 |

FOREIGN PATENTS

| | | |
|---|---|---|
| 589,761 | 12/59 | Canada. |

M. CARY NELSON, *Primary Examiner.*